United States Patent [19]
Bernolák et al.

[11] 4,135,785
[45] Jan. 23, 1979

[54] X-RAY LIGHT DIVIDER

[75] Inventors: Kálmán Bernolák; Sándor Mészáros, both of Budapest, Hungary

[73] Assignee: Medicor Müvek, Budapest, Hungary

[21] Appl. No.: 827,686

[22] Filed: Aug. 25, 1977

[30] Foreign Application Priority Data
Aug. 25, 1976 [HU] Hungary .......................... ME2012

[51] Int. Cl.² ............................................. G02B 27/14
[52] U.S. Cl. ..................................... 350/172; 250/320
[58] Field of Search ............... 350/172, 171, 169, 174, 350/299, 286, 32, 33; 354/104; 355/32; 250/320

[56] References Cited
U.S. PATENT DOCUMENTS
3,614,449  10/1971  Ward ....................... 350/172

FOREIGN PATENT DOCUMENTS
743062  3/1933  France ..................... 350/172

Primary Examiner—Jon W. Henry

[57] ABSTRACT

Divider for directing an X-ray light beam into two or three directions, which beam emerges from the screen of an X-ray image intensifier in diagnostic X-ray arrangements. The divider is disposed at 45° with respect to the optical axis, and consists essentially of a slit mirror which has a non-transparent metallization with one or two non-metallized, transparent areas or gaps therein, these areas corresponding to the required divisional ratios, there being similarly non-transparent mirrors or reflecting prisms behind the gaps.

6 Claims, 4 Drawing Figures

X-RAY LIGHT DIVIDER

X-ray light divider for equipment provided with image intensifiers, comprising a partially light-transmitting split mirror behind the usual collimator optics, the mirror being at about 45° with respect to the optical axis.

In the two main territories of diagnostic X-ray technology, namely in transillumination and in making exposures, it is most important to be able to divide the light of the nowadays indispensable X-ray image intensifier in at least two directions, with an appropriate, controllable ratio, so as to attend to the transillumination and to make an exposure at the same time.

In X-ray equipment fitted with an intensifier, transillumination is usually carried out by way of a TV camera adapted to a first light channel, usually in the form of a monitor. Exposures are made through a second or a third channel, by adapting thereto a moving film camera or a so-called spot film camera.

It is well known that such equipment should be operated with only a minimum X-ray exposure to the patient, regardless of the applied operational mode (transillumination, single-frame exposure, moving film sequence). It is also a requirement that a specific amount of light or intensity be available for each mode, as needed by the particular sensitivity of the TV or film camera and the like sensing unit. It is also necessary to allow observation of the image on a TV screen, simultaneously with the actual making of an exposure.

It has been established that it is best, in consideration of the present degree of development of the presently used units, to convey about 90% of the available useful light quantity to the camera, while 10% are sufficient for the TV camera or for visual observation. It should be clear that this ratio might be subject to changes when technology develops further in this area. When only transillumination is carried out, an optimally high proportion of the available light should be directed to the TV camera.

The known two- and three-channel light dividers solve these tasks in two different ways. In one, image transmission is ensured with tandem optics, a partly transparent and partly non-transparent mirror being disposed between the optical elements so that the transmission path remains rectilinear while the reflected path makes for a beam diversion in a perpendicular direction. The mirror can be removed.

In the other solution, mainly applied for three-channel dividers, there is a special (non-transparent) mirror behind a primary light-transmitting mirror disposed at 45 degrees, the special mirror being perpendicular to the light beam so as to reflect the beam back onto the primary mirror, whereby that beam is projected in a direction perpendicular to that of the original impinging beam.

In both cases there are collimator optics behind the X-ray image intensifier, providing non-linear light distribution, so that the parallel beam of rays has a higher intensity near the edges than along the optical axis.

A characteristic feature of the known arangements is the partly transparent dividing mirror. The latter is usually formed by a thin metal layer applied by vaporization under vacuum to a glass plate. The application of partly transparent mirrors brings about difficulties in regard to efficiency, performance and technology. In order to achieve the desirable 90% - 10% divisional ratio, the reflection of the dividing mirror, for example with the second solution, cannot be higher than 70% on account of the absorption of the metal film or layer. Assuming an absorption of 18%, about 12% can pass the dividing mirror, of which the special or auxiliary mirror (assuming one of very good quality) reflects 11%: of the latter, about 70% is allowed to pass to the TV camera by the dividing mirror, which is a mere 7.7%. Assuming a similar degree of absorption for the first known solution, only about 12% would reach the TV camera.

Compared to the ideal situation, it would become necessary to subject the patient to a 20% dose increase on account of the mirror having 70% reflection. For constructional reasons it is difficult to control the ratio of the reflection and the transmission of partly transparent mirrors. One of the reasons is that the rather complex refractive index that determines the reflection, the absorption and the transmission of the metal layer changes for unexplained reasons with the thickness of that layer; and furthermore it also depends on the purity of the evaporated material and on the vaporizing speed. For technological and economical reasons it is difficult to strictly observe the experimentally established evaporating conditions. It would also become necessary to apply optically planar machining to both surfaces of the dividing mirror.

The mirror systems of the dividers always determine the positions where the camera(s) can be attached, in which respect the following considerations apply.

In the first known solution mentioned earlier, the TV camera is applied to the first channel in the optical axis of the system, thereby extending its longitudinal dimension; the spot or film camera would be disposed in a perpendicular direction, in the second channel. The length of such an arrangement is such that it cannot be accommodated within the conditions of movement provided for X-ray examinations, and rooms would have to be chosen that are much higher than average hospital wards and the like rooms where such examinations are made. Room heights of 3.2 meters have been internationally accepted, whereagainst the requirement of such arrangements would be at least 3.4 meters, an increase of 20 centimeters (or almost 8 inches) which would seriously handicap the applicability of the X-ray equipment in question. When constructing new facilities it would thus become necessary to reckon with such room height increases, causing serious economic and architectural problems.

In the second earlier-mentioned solution the cameras, namely the TV, spot and film cameras, are all disposed perpendicular to the optical axis of the arrangement.

The total light emission or projection into the channels can be tabulated in the following in accordance with the requirements of X-ray diagnostic procedures.

| Light Channel | Total Luminous Output | | Camera |
|---|---|---|---|
| | Transillumination | Exposure | |
| First Known Solution | | | |
| I. | 100% | — | TV |
| II. | 12% | 70% | Spot or Film |
| Second Known Solution | | | |
| I. | 70% | — | TV |
| II. | 7.7% | 70% | Spot or Film |
| or: | | | |
| I. | 70% | — | TV |
| II. | — | 70% | Spot |
| III. | 7.7% | 70% | Film |

As can be seen from the preceding Table, it is only with channel II. that an exposure can be made which is checked by a simultaneous transillumination. Depending on the kind of X-ray examination to be performed, it is therefore necessary with the known solutions to interchange the cameras between the second and third channels when making serial spot exposures.

In the first known solution, 100% light transmission is possible with the mirror; however when the mirror is removed the optical axis of channel I. is shifted, in a parallel direction, by about 3 millimeters, owing to the absence of light refraction by the glass plate which is usually 8 to 12 millimeters thick. On account of the non-linear light distribution of collimator optics this results in a rather unfavorable light distribution and brings about a deterioration of sharpness. The known arrangement attempts to keep the quality deterioration within acceptable limits by adjusting a median axis shift, both with and without the mirror, in that, for example, a 3 millimeter change in the optical axis is broken up into ± 1.5 mm shift values, as a result of which, it will however be clear, optimum light distribution cannot be attained in any one of the operational modes, neither on the image area, nor in terms of picture sharpness.

For further reference, it appears simpler to relate the characteristics of the known equipment solutions as follows, based on the preceding Table: (a) as a first mode of operation, transillumination will be considered, usually through a "first channel"; (b) second, moving film exposures should be feasible, simultaneously with mode (a); and finally (c) spot exposures are also required, the modes (b) and (c) being performed through second and third channels of such light dividers — the "third channel" being optional and not necessarily provided.

It is the object of the present invention to eliminate the drawbacks and inconveniences of known arrangements and devices, namely primarily the applicability disadvantages resulting from the poor efficiency of partly transparent mirrors, and the so far unavoidable shift of the optical axis.

According to important features of the invention, the mirror is provided in the form of a non-transparent slit mirror on which a light-transmitting gap is provided for each of the additional channels, an additional mirror or prism being disposed behind the gaps, having a respective reflecting surface that is perpendicular to the slit mirror.

According to an optional inventive feature, a symmetrical or asymmetrical light gate may be provided behind one or both gaps to limit the light beam passing therethrough.

It is one of the novel features of the invention that the slit mirror can be pivoted or rotated about an axis that is substantially parallel to the lengthwise optical axis of the system, including of course the collimator optics therein.

The X-ray light divider according to the invention can be built with modest expenditures, much lower than those that were hitherto required, yet the efficiency is greatly increased as compared to the hitherto used fully transparent mirrors. There is no optical axis shift when changing from one operational mode to the other, all the more because the mirror does not have to be removed or even changed in its position.

The inventive exemplary light dividers allow excellent light distribution conditions to be achieved, satisfying all diagnostic requirements, by themselves and among the light channels. As an added advantage, a three-channel division is possible without turning the mirror.

Further objects, features and advantages of the invention will be explained and described hereainafter in more detail, which will best be understood from the following detailed description with reference to the accompanying drawings, wherein FIG. 1 is a somewhat schematic, partly broken away sectional view of an exemplary three-channel X-ray light divider according to the invention, viewed in a plane that corresponds to a spot-exposure operational mode;

Figure 1:
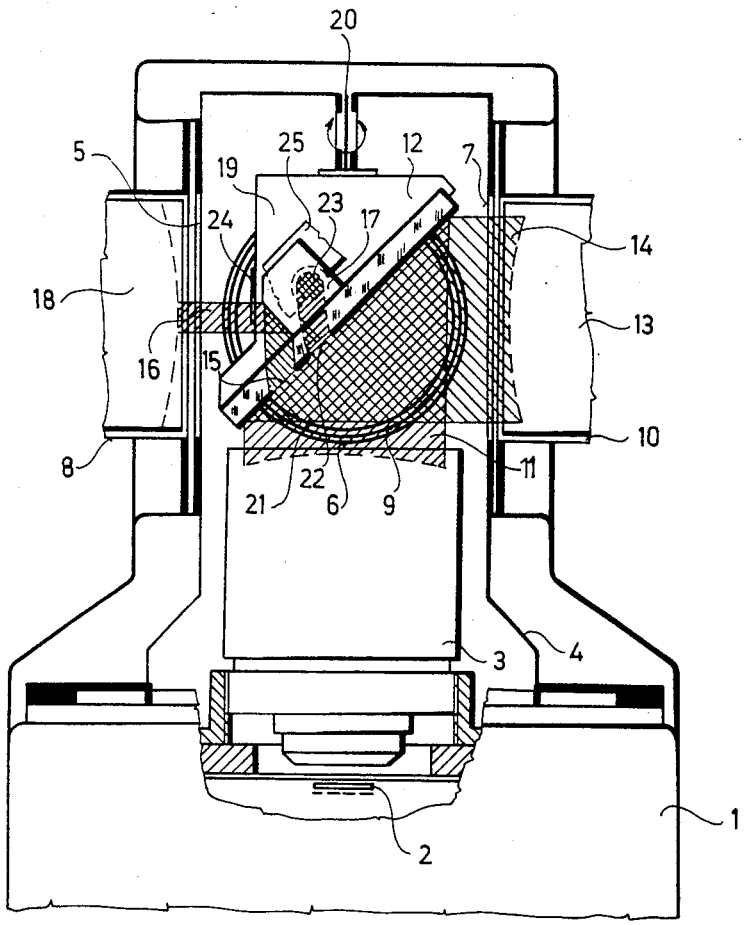
Figure 2:
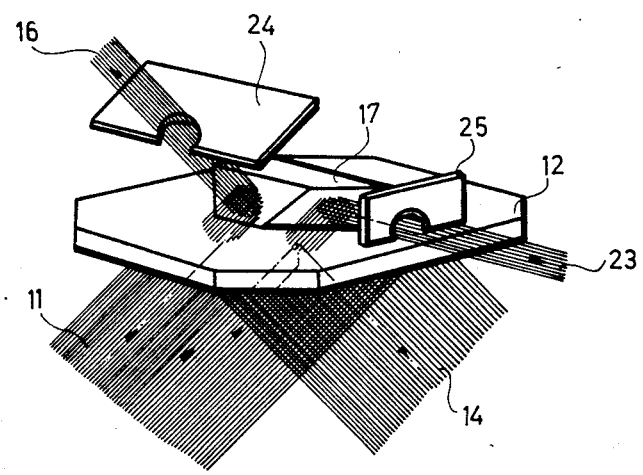
FIG. 2 illustrates in a perspective partial view the three light beams obtained with the divider according to FIG. 1.
Figure 3:
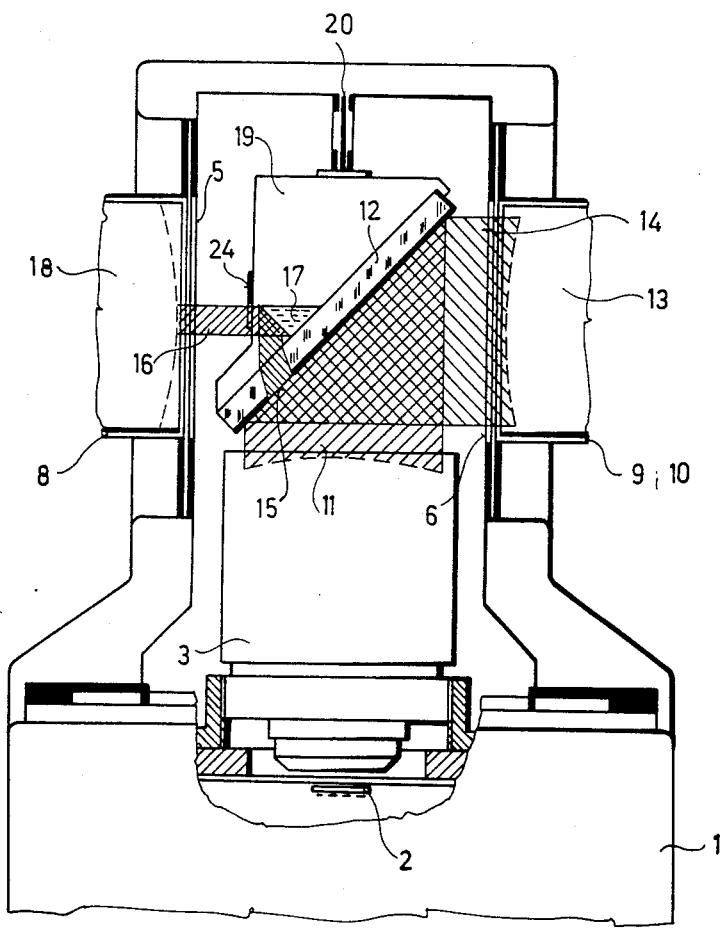
FIG. 3 is a sectional view similar to that of FIG. 1 but of another, somewhat simplified light divider, having two channels, viewed in a plane corresponding to a combined (spot or film) exposure operational mode.
Figure 4:
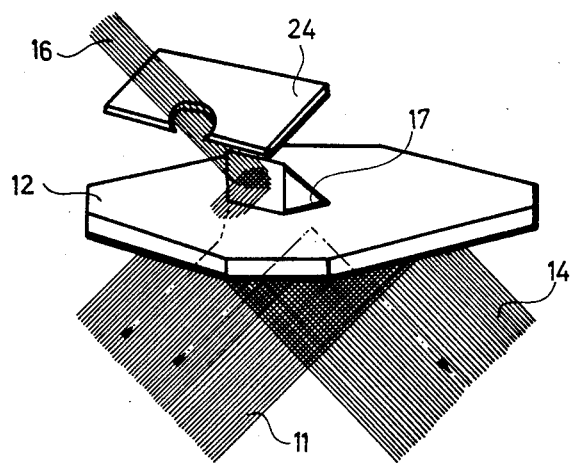
FIG. 4 is similar to FIG. 2, showing the two light beams obtainable with the exemplary light divider of FIG. 3.

Although the exemplary embodiment of FIGS. 3 and 4 is simpler, and can be expanded by the addition of parts to become that of FIGS. 1 and 2 (two and three channels, respectively, in the two exemplary embodiments), the three-channel embodiment will be described first. A head portion 1 of a conventional image intensifier used in such arrangements is shown in FIG. 1, with an exit screen 2 therein, followed by collimator optics 3 in the direction in which the entering light beam proceeds, which is identified in FIG. 2 by numeral 11. The X-ray divider has an outer housing portion 4 into which all parts can be assembled for proper support and protection. The divider is arranged at 45°, approximately, with respect to and centered onto the optical axis of the system (parts 2, 3 and beam 11).

As was explained in the introduction, a three-channel divider of this kind has to be suitable for three kinds of operations: (a) transillumination, for example with a TV screen; (b) film exposures; and (c) spot exposures, the latter mode being the one in which the exemplary device is illustrated in FIG. 1. It will be seen later that the simpler of the two disclosed embodiments, of FIGS. 3 and 4, combines the possibility of the operations (b) and (c) in one channel, thereby presenting an even more versatile but two-channel X-ray light divider arrangement.

It will be understood that the beam 11 of the optics 3, constituting a first element of the optical system of the divider, is properly focused onto the exit screen 2 of the image intensifier. Subsequent elements of the optical system are designed according to the invention, as will be described hereinafter.

The divider has three light image channels, identified by numerals 5, 6 and 7, which can be seen in FIG. 1 as being on the left-hand side, toward the viewer, and on the right-hand side, respectively, and which allow the above-explained operational modes (a), (b) and (c) to be respectively practiced. FIG. 2 shows that these channels are displaced by 90° each with respect to each other; they respectively lead to a TV camera 8, a film camera 9, and to a spot camera 10 (only broken-away, schematic parts of these conventional units are shown in FIG. 1). The inventive divider provides for the angular adjustment of the units 8, 9 and 10 (not shown in detail).

It can be seen in FIG. 1 that TV camera 8 (for operation (a)) has optics 18 in channel 5, film camera 9 (for (b)) has optics 21, schematically shown at channel 6, and that spot camera 10 (for operation (c)) has optics 13.

In accordance with the invention, the light divider 4 includes a slit mirror 12 (substituting the earlier described mirrors of the known arrangements), which mirror has additional optical features as will be explained.

When operating according to (c), the entire luminous intensity of the beam 11 from the exit screen 2 impinges upon the mirror 12 through the optics 3. As shown, the mirror has substantially circular or oval-shaped non-reflecting, transparent areas 15 and 22, constituting gaps for the passage of beams that serve for the channels 5 and 6, respectively (modes (a) and (b)).

On the side of the mirror 12 that is opposite the impinging beam 11, the invention furthermore provides a small mirror or prism 17, for purposes to be described hereafter. A pivotable socket or support 19 is preferably disposed in the divider 4 for holding the mirrors 12, 17 and possibly other parts of the inventive device, such as the light gates to be described later.

For transilluminations according to (a), the area 15 of slit mirror 12 allows about 10% of the beam to proceed, in the form of a beam 16, being diverted by a surface of mirror or prism 17 that is perpendicular to the main surface of the slit mirror 12, as can be seen just to the left of the top center of FIG. 1.

When using the divider for mode (b), namely for film exposures, the support 19 can be pivoted about 90°, with the mirrors 12, 17 thereon, about an axis 20 that is parallel to the earlier-mentioned optical axis of the parts 2, 3. The area 22 of slit mirror 12 allows about 80% of the light beam to proceed toward channel 6, as a further beam 23 (passing in a direction perpendicular to the plane of the drawing).

Finally, when operating per (c), the underside of the slit mirror 12 reflects and rotates about 80% of the beam 11 (see the bottom part of FIG. 2) toward the optics 13 of the spot camera 10, constituting a light beam 14 passing to channel 7 (right-hand side of FIG. 1).

An optional feature is also provided according to the invention to eliminate or to throttle disturbing light-beam portions that might impinge upon the optics 18 and 21 (channels (a) and (b), respectively). This is accomplished by providing one or both of light gates 24, 25 (see FIG. 2), which can be pivoted together with the mirror system 12, 17 (and the support 19), namely in the beam paths 16, 23, respectively. Uniform light distribution can be ensured by the intercalation of these gates which allow only the desirable amounts and portions of the beams to pass to the channels 5 and 6.

When switching to mode (a) from the illustrated position, pivoting or rotation of the mirrors 12, 17 by 90° brings approx. 80% of the beam 11 to the optics 18 of the TV camera 8. It might be added at this point that the described beams 11, 14, 16 and 23 necessarily also contain non-psrallel components although the drawings were made with parallel hatchings for the sake of simpler illustrations.

By way of summary it will assist the understanding of the described exemplary, three-channel light divider embodiment to recapitulate that: parts and beams 1, 2, 3, 11, 12 and 19 relate to all three operational modes; 5, 8, 15 to 18 and 24 to mode (a); 6, 9, 20 to 23 and 25 to (b); and 7, 10, 13 and 14 to mode (c).

We are now coming to the description of the two-channel embodiment of FIGS. 3 and 4. Differences in details are now being described for this simplified light divider. This device can be used for transillumination, operational mode (a), and also for film as well as spot exposures, provided by way of a combined second channel that is capable of performing the exposure modes (b) and (c), as will be seen.

In FIG. 3 it can be seen that the channel 6 takes the place of channel 7 of FIG. 1 (while the perpendicular channel 6 of FIG. 1 is not used here). The first exit beam 16, for channel 5, is the same as in the first embodiment; but the second beam 14 now serves either a film camera or a spot camera, as shown by the use of both numerals 9 and 10 at the optics 13. FIG. 3 is simpler than FIG. 1 owing to the omission of the omitted parts 7, 21, 22, 23 and 25 (of the first embodiment). The slit mirror 12 has only one non-reflecting area, 15, the mirror or prism 17 performing the beam diversion with its surface perpendicular to the main surface of the slit mirror 12.

It will be understood from the foregoing that in FIGS. 3, 4 the two channels 5, 6 are displaced by 180° degrees with respect to each other (as against the 90° arrangement of the three channels in FIGS. 1, 2). Owing to the somewhat different optical conditions, the exposure mode (b), (c) allows more light to pass toward channel 6 than in the three-channel embodiment, namely about 90% (as against 80%), well suitable for either film or spot exposures to be taken by the aid of the inventive X-ray light divider.

The optional light gate 24 (there being no need for a second such gate), pivotable together with the mirror system 12, 17, again eliminates undesirable portions of the beam 16, as was described earlier.

The system can be pivoted by 180° about the axis 20, out of the illustrated position, to bring the optics in a condition required for operational mode (a), in which 90% of the light is available (as against 80% of the first embodiment), in a manner similar to that just described for the combined mode (b), (c).

It is characteristic for both exemplary light dividers that a slit-type special mirror system is provided, with two or three light channels, the system being disposed at 45° with respect to the longitudinal optical axis, the slit mirror having a non-transparent metallization with one or two non-metallized areas or gaps therein, with areas that correspond to the required divisional aratios, there being similarly non-transparent mirrors or reflecting prisms behind the gaps. Depending on the embodiment, the system can be pivoted by 90 or 180 degrees about a suitable axis.

There is preferably one gap for each additional channel and mirror, in association with the basic slit mirror, with optional light gates for limiting the light beams and throttling undesirable areas thereof.

The present invention is more efficient than other solutions where light division is accomplished with light-transmitting mirrors and the like. and also ensures the divisional ratio to be accomplished without any limitation. In each of the operational modes, it is still possible to observe the exposure by the aid of conventional transillumination.

The described characteristics of the inventive dividers can be applied and used independently of other particulars, for example mechanical, electrical or pneumatic controls and movements of the divider are equally possible.

Any image advancement can be used for purposes of image pick-up or freezing. The ratio of the image division can be chosen at will, without any limitations, and the light gates which pivot together with the mirror system ensure uniform light distribution over the entire image areas. Either of the exposure modes can be accompanied by transillumination, on any one of the light channels. The rotational axis of the mirror system, substantially in the area of the longitudinal optical axis of the arrangement, makes for a reasonable space exploitation since the attached cameras do not increase the length of the arrangement.

The inventive slit mirror that has a non-transparent metallization thereon offers substantial advantages in quality, structure, technology as well as economy.

It is nowadays possible to achieve reflections exceeding 90% when using modern metallized mirrors; the divisional ratio is easily calculated; such mirrors are cheaper and more economical to manufacture than partly transparent mirrors of the earlier types. Optics are nowadays designed by computerized procedures, which also allows the locations of the non-reflecting, transparent areas to be ideally determined within wide ranges, thereby dispensing with the need for dividing the entire extent of the light beam.

Those skilled in the prior art will understand that various departures from, modifications in and/or additions to the disclosed two exemplary light divider embodiments are possible within the spirit and scope of the present invention.

What we claim is:

1. An X-ray light divider for equipment fitted with an image intensifier (1) having an exit screen (2) and collimator optics (3), having an optical axis, in the path of the emitted light beam, the divider comprising: a slit mirror (12) being reflecting and non-transparent over substantially its entire area, yet having thereon at least two gaps (15, 22) which are transparent and non-reflecting, said slit mirror being centered onto the optical axis and supported by first pivoting means (19) at an angle of approx. 45° with respect to the axis; and at least one reflecting optical element (17) adjacent said gaps; second means (19) for pivoting said element with said slit mirror also about the axis, for deflecting the light beam that passes through said gaps, with a surface of said element substantially perpendicular to said area of the slit mirror; thereby forming at least three light channels (5, 6, 7) of which one (5) receives a light beam by reflection from said area of the slit mirror, while at least two other channels (6, 7) obtain respective light beams by way of said gaps.

2. The X-ray light divider as defined in claim 1, wherein said optical element (17) is a prism.

3. The X-ray light divider as defined in claim 1, further comprising at least one light gate (24, 25) adjacent said optical element (17) for limiting the light beam passing therethrough.

4. The X-ray light divider as defined in claim 1, further comprising a support (19) constituting at least one of said pivoting means.

5. The X-ray light divider as defined in claim 1, wherein one (5) of said light channels (5, 6, 7) is suitable for transillumination simultaneously with the operation of at least one of the other channels (6, 7), which latter is selectively suitable for film and spot exposures.

6. The X-ray light divider as defined in claim 1, wherein said light channels (5, 6, 7) are substantially in the same plane, two (5, 6, 7) of said channels being in substantially opposite directions with respect to each other.

* * * * *